(12) United States Patent　　　　(10) Patent No.:　US 12,679,368 B2

Fröhlich et al.　　　　　　　　　　(45) Date of Patent:　　Jul. 14, 2026

(54) PROFILING AND COMPARISON OF CORNERING SIGNATURES FOR SAFETY ASSESSMENT

(71) Applicant: Dell Products L.P., Round Rock, TX (US)

(72) Inventors: Herberth Birck Fröhlich, Florianópolis (BR); Alisson Linhares de Carvalho, Campinas (BR); Marcus Vinicius Libardi Pazini, Caxias do Sul (BR)

(73) Assignee: Dell Products L.P., Round Rock, TX (US)

( * ) Notice: Subject to any disclaimer, the term of this patent is extended or adjusted under 35 U.S.C. 154(b) by 118 days.

(21) Appl. No.: 18/625,624

(22) Filed: Apr. 3, 2024

(65) Prior Publication Data

US 2025/0313206 A1　　Oct. 9, 2025

(51) Int. Cl.
　　B60W 30/00　　　(2006.01)
　　B60W 30/045　　(2012.01)
　　B60W 30/18　　　(2012.01)
(52) U.S. Cl.
　　CPC .... B60W 30/18145 (2013.01); B60W 30/045 (2013.01); B60W 2552/30 (2020.02)
(58) Field of Classification Search
　　CPC ......... B60W 30/18145; B60W 30/045; B60W 2552/30
See application file for complete search history.

(56) References Cited

U.S. PATENT DOCUMENTS

| | | | |
|---|---|---|---|
| 2018/0194344 A1* | 7/2018 | Wang | G05D 1/027 |
| 2019/0250269 A1* | 8/2019 | Miu | G01S 13/931 |
| 2020/0139971 A1* | 5/2020 | Bucht | B60W 30/18145 |
| 2022/0089180 A1* | 3/2022 | Kim | B60W 30/18145 |
| 2023/0258458 A1* | 8/2023 | Malson | G01C 21/32 |
| | | | 701/533 |

OTHER PUBLICATIONS

Mejia, et al., "Vehicle Speed Estimation Using Computer Vision and Evolutionary Camera Calibration," Conference on Neural Information Processing Systems, 2021.

Kocur, "Perspective transformation for accurate detection of 3D bounding boxes of vehicles in traffic surveillance," Computer Vision Winter Workshop, 2019.

(Continued)

*Primary Examiner* — Logan M Kraft
*Assistant Examiner* — Sherman D Manley
(74) *Attorney, Agent, or Firm* — Workman Nydegger

(57)　　　　　ABSTRACT

Profiling and comparison of cornering signatures for safety assessment. For a cornering events, a safe curve is determined, which may include a set of safe key points. Usage curves, which may include detected cornering events, are processed to identify usage key points. The usage key points are mapped to the safe key points in a manner that accounts for time dilation/compression. Distances between the respective usage and safe key points are determined to determine an overall disagreement level, which corresponds to a risk. Safety related assessments or safety operation may be performed based on the disagreement level and/or rules related to the safe curve.

16 Claims, 8 Drawing Sheets

(56)　　　　　　References Cited

OTHER PUBLICATIONS

Kocur, et al., "Detection of 3D Bounding Boxes of Vehicles Using Perspective Transformation for Accurate Speed Measurement," Machine Vision and Applications, 2020.

Giorgino, "Computing and visualizing Dynamic Time Warping in R: The dtw package," Journal of Statistical Software, vol. 3, No. 7, pp. 1-24, 2009.

Harris, et al., "Array programming wth NumPy," Nature, vol. 585, pp. 357-362, 2020.

* cited by examiner

Figure 4

```
Algorithm 1 - extracting key points from curve

# S is the curve acquired using computer vision algorithm consisting of
n points composed of [timestamp, speed]

diff is a function to obtain the first derivative of a series min is a function to get the index of the minimum value of a series max is a function to get the index of the maximum value of a series key_points = [ , , , ,] # an empty vector of size equals 5 with a tuple
within each element (ID, timestamp, speed)

S_diff = diff(S)

First Key point key_points[1] = (1, S[1][timestamp], S[1][speed])

Fifth Key point key_points[5] = (5, S[end][timestamp], S[end][speed])

Third Key point index_three = min(S)

key_points[3] = (3, S[index][timestamp], S[index][speed])

Second Key point index_two = min(S_diff)

key_points[2] = (2, S[index_two][timestamp], S[index_two][speed])

Fourth Key point index_four = max(S_diff)

key_points[4] = (4, S[index_four][timestamp], S[index_four][speed])
```

402

Load Key Points of Safe Curve and Rules
510

Acquire a Cornering Event (Usage Curve)
512

Obtain Key Points from Usage Curve
514

Apply DTW Between Safe Key Points and Usage Key Points
516

Obtain Disagreement Level
518

Average Disagreement Levels
520

Usage
508

Design a Safe Curve
502

Obtain Key Points of the Safe Curve
504

Define Business Rules to Apply During Usage
506

Preparation
500

```
Algorithm 2 - calculate resulting disagreement level.

KP_safe is the key points related to S_safe

KP_usage is the keypoints from the ongoing S_usage

# Rules is a list of a list of pairs, containing a certain number
    of paired key points.

apply_dtw is a function that receives two segments and yields a distance transfer_function is the function to turn the resulting averaged
    DTW into a percentage dtw_distances = []

for pair in Rules:

kpStart = pair[0]

kpEnd = pair[1]

distance = apply_dtw((KP_safe[kpStart], KP_safe[kpEnd]), (KP_usage[kpStart], KP_usage[kpEnd])), distance_percentage = transfer_function(distance)

dtw_distances.append(distance_percentage)

resulting_disagreement = average(dtw_distances)
```

PROFILING AND COMPARISON OF CORNERING SIGNATURES FOR SAFETY ASSESSMENT

COPYRIGHT AND MASK WORK NOTICE

FIELD OF THE INVENTION

Embodiments of the present invention generally relate to assessing safety in an environment. More particularly, at least some embodiments of the invention relate to systems, hardware, software, computer-readable media, and methods for assessing warehouse scenarios including cornering events for safety purposes.

BACKGROUND

Environments such as a warehouse can be dangerous. Heavy equipment vehicles (e.g., forklifts, robots) are performing various tasks that may include transporting heavy pallets. Whether drivable or autonomous, there is a need to implement safety standards due to the risks associated with operating these vehicles and for other reasons. For example, a loaded forklift that turns a corner at too sharp an angle or at excessive speed, may cause a serious accident.

There are methods of machine learning that can aid in the detecting dangerous cornering events. However, these machine learning methods rely heavily on data that reflects real-world scenarios. Gathering this data is challenging, may pose safety risks, and may be overly time consuming. An alternative is to use simulations and surrogate models to generate the necessary statistics, but these simulations and surrogate models also need realistic real-world data to validate outputs and produce accurate results.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 4 illustrates aspects of extracting key points from a curve;

FIG. 7 discloses aspects of determining a disagreement between a usage curve and a safe curve.

DETAILED DESCRIPTION OF SOME EXAMPLE EMBODIMENTS

Figure 1:
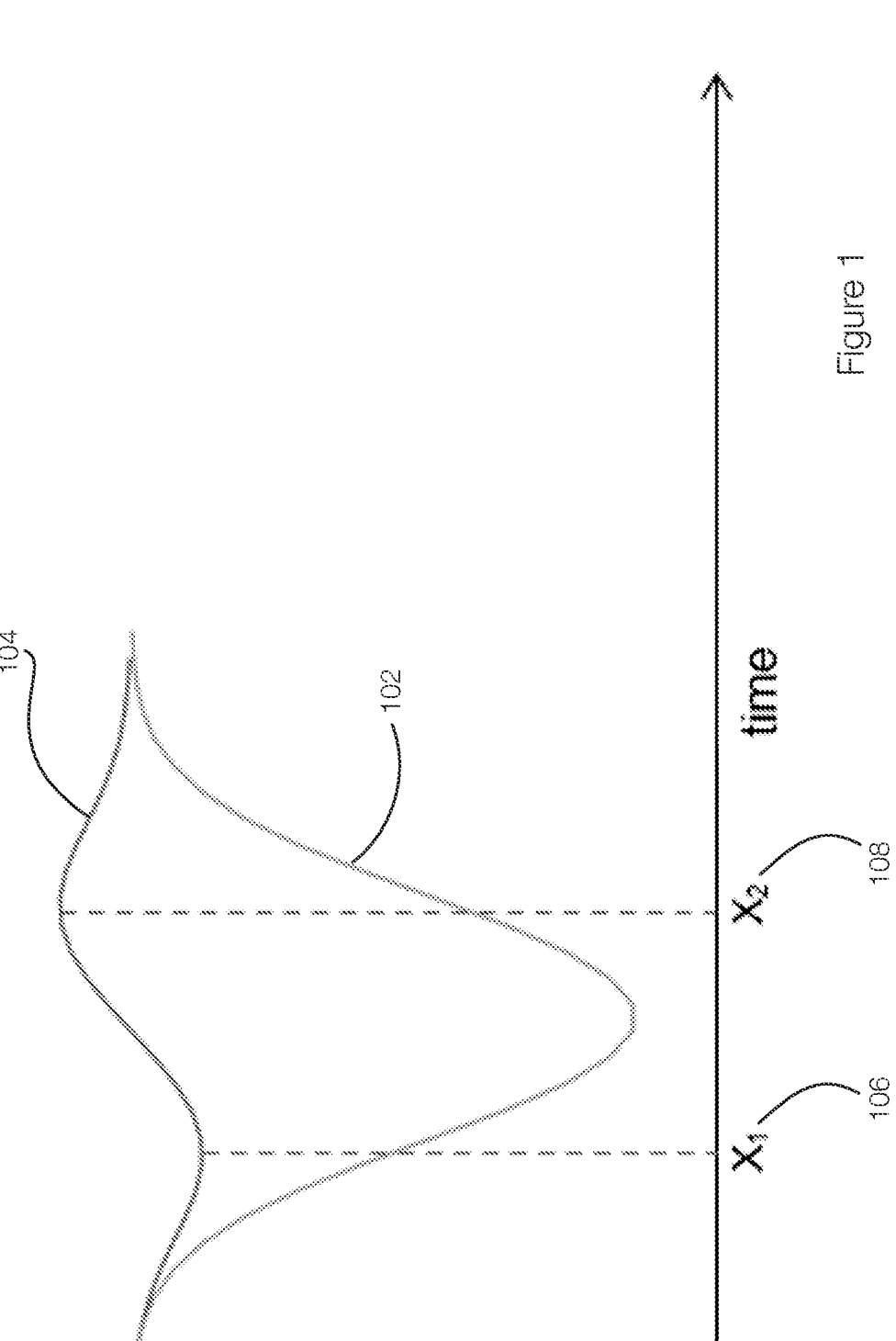
FIG. 1 discloses aspects of a speed curve, a derivative of the speed curve, and inflection points in the speed curve.

Embodiments of the present invention generally relate to assessing safety in environments such as warehouse environments. More particularly, at least some embodiments of the invention relate to systems, hardware, software, computer-readable media, and methods for evaluating and profiling vehicle maneuvers such as cornering.

Embodiments of the invention may relate to simulations that include safety assessments and similarity assistance. Embodiments of the invention are discussed in the context of cornering events, but may be applied to other scenarios that may occur in a given domain. Embodiments of the invention are discussed in the context of vehicles (e.g., autonomous vehicles, forklifts) that may operate in a warehouse environment. These vehicles perform various maneuvers including cornering maneuvers and embodiments of the invention relate to profiling and comparing cornering signatures for safety assessment.

In one example, images are acquired from cameras that are placed to capture the desired scenario. The cameras, which may already be installed, allow the speed and displacement of vehicles to be measured using off-the-shelf computer vision methods. A cornering signal or signature is built for a captured cornering event and compared to a standard cornering signature to build a disagreement level. The disagreement level can reflect the risk of the cornering event.

Embodiments of the invention can be implemented in smart cities scenarios (parking lots, urban areas), where roads and streets are already monitored by cameras or such sensors can be easily installed, and telemetry can be used to virtualize the segments and provide a step further in assessing safety and safety statistics. Autonomous vehicles can retrieve information from cornering data to improve their driving capabilities. Embodiments of the invention may be implemented at the edge and services/processing related to these types of events can be offered using micro-data centers, edge based systems, and/or cloud based systems. Embodiments of the invention may also be implemented in or used by digital twins or other virtual entity technologies.

In one example, cameras located at corners may be calibrated. Images generated by these cameras may be sent to a datacenter for processing. In one example, the processing may include object detection operations, object tracking operations. The object detection and tracking operations may be used to estimate the speed and position of one or more vehicles crossing a predefined region. This information may be used to build speed curve profiles.

Cornering events are created in one example by referencing inflection points and their respective relations in the curve profiles. These curve profiles (or signatures) may be compared to target curve profiles that are considered to be safe curve profiles or safe curve signatures. The comparison may yield disagreement levels. The risk of the cornering event correlates with the disagreement level. Higher disagreement levels correspond to higher risk.

Individual curve profiles may be also stored and used to build clusters, or a cornering identity of one or more vehicles/drivers, which can be used later to feed simulations and provide their potential outputs as well as further surrogate model development.

More specifically, embodiments of the invention relate to determining a disagreement level during cornering events that represent risk and to profiling cornering events for further vehicle or driver modeling or improvement or training.

In one example, the speed of a vehicle may be estimated using lidar or radar. Computer vision also provides the ability to determine the speed of a vehicle and/or track a vehicle in space.

Applications may combine images and computer vision to estimate a vehicle's speed using algorithms such as YOLOv4 and object trackers. These may be associated with mean and median errors such as by way of example only 0.76 km/h and 0.61 km/h respectively.

Embodiments of the invention are configured to capture and evaluate cornering events for vehicles traveling on both directions. More than one vehicle can be evaluated if on occlusion occurs. These images can be processed at the different locations including the far edge, such as using NVIDIA Jetsons. This allows processed information to be provided to a core station or datacenter.

Embodiments of the invention may also use time series analysis. In time series analysis, Dynamic Time Warping (DTW) is a consolidated algorithm for measuring similarity between two temporal sequences, which may vary in frequency, phase, and amplitude. The result of a DTW application is a single distance metric, ranging from 0 (completely superposed curves) to positive infinity. In contrast to Euclidean distance, DTW creates a distance matrix to find the closest relation between points. This allows curves that have different numbers of points and are displaced in relation to the same origin to be compared. One software package for DTW may be dtw-python.

Embodiments of the invention may also use inflection points from the speed curve, which are drawn from a first derivative, to determine key points in a cornering event. These points may correspond to acceleration changes (braking/retaking) and where the velocity reaches its minimum value (cornering apex). These points may be used for performing curve matching between an ideal cornering profile and a detected or executed cornering profile.

FIG. 1 discloses aspects of a speed curve. FIG. 1 illustrates a speed curve 102 and a first derivative 104. FIG. 1 also illustrates inflection points 106 and 108. These aspects of the speed or velocity curve and its first derivative (e.g., acceleration) may be used when determining a disagreement level.

Figure 2:
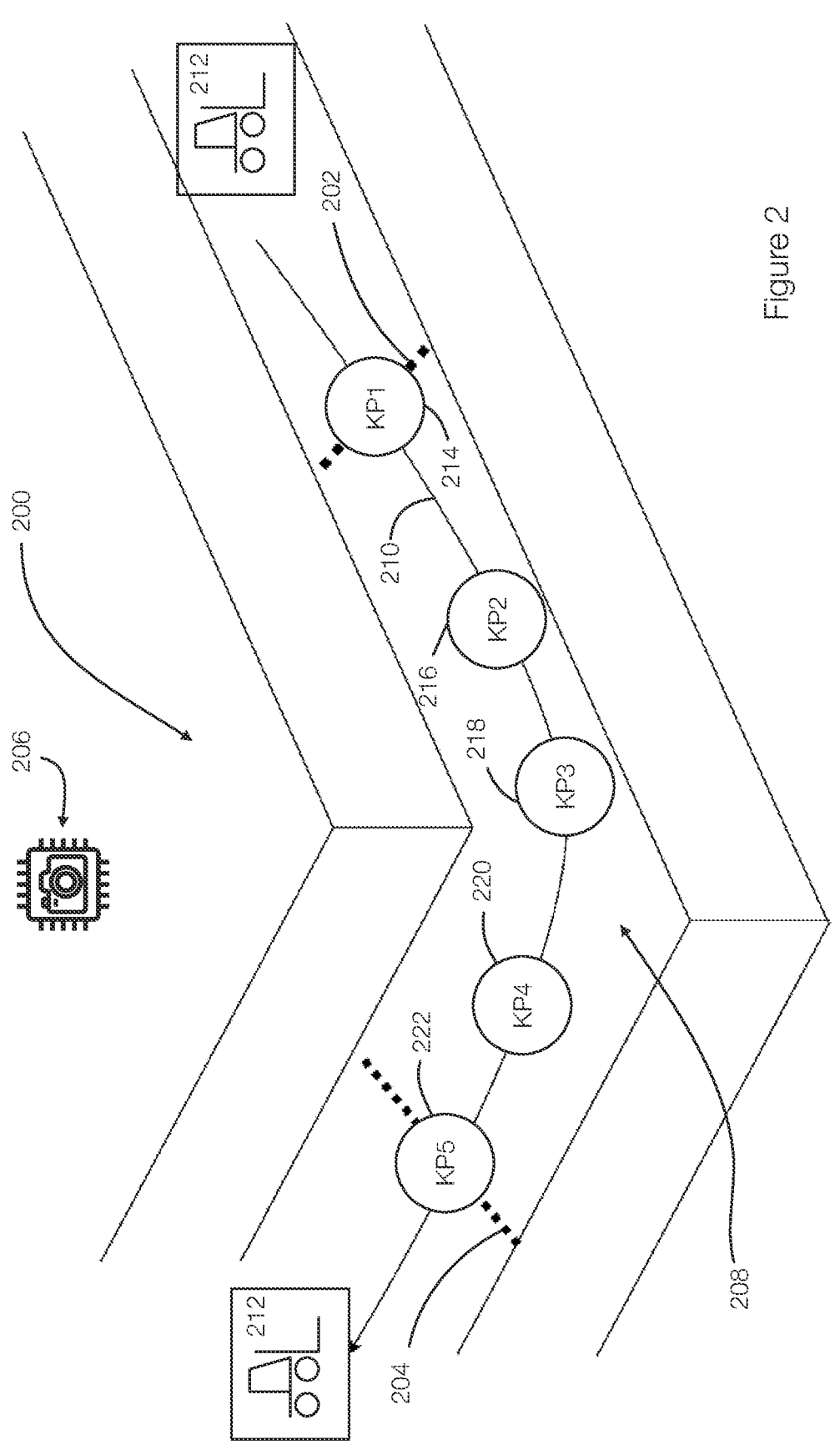
FIG. 2 discloses aspects of a cornering event.

FIG. 2 discloses aspects of a cornering event. Generally, a vehicle 212 (e.g., a forklift) enters the area of interest 208 (from the right side of FIG. 2 in this example) at a certain speed. During the cornering event 200, the vehicle 212 loosens or reduces the throttle and brakes before reaching the cornering apex. The vehicle 212 then accelerates to leave the corner and leaves with a certain exit speed. The cornering event 200 may be associated with certain points.

More specifically, FIG. 2 illustrates a cornering event 200 that may also represent a view of a camera 206. FIG. 2 illustrates an area of interest 208 that is bounded by cornering boundaries 202 and 204. The cornering event 200 occurs from right to left along a path 210 in this example. At point 214, the vehicle 212 (e.g., forklift) enters the area of interest 208 with an entry speed $KP_1$. At point 216, a braking inflection point $KP_2$ is determined. The braking inflection point represents a start of a braking operation (first derivative minima) and is related to a maximum deacceleration.

At point 218, a cornering apex point $KP_3$ is determined. The cornering apex point is a root of the first derivative in one example. At point 220, a retaking inflection point $KP_4$ is determined. This represents the end, in one example, of the cornering event 200 and is an example of a first derivative maxima. At point 222, the vehicle leaves the area of interest 208 with an exit speed $KP_5$.

Figure 3:
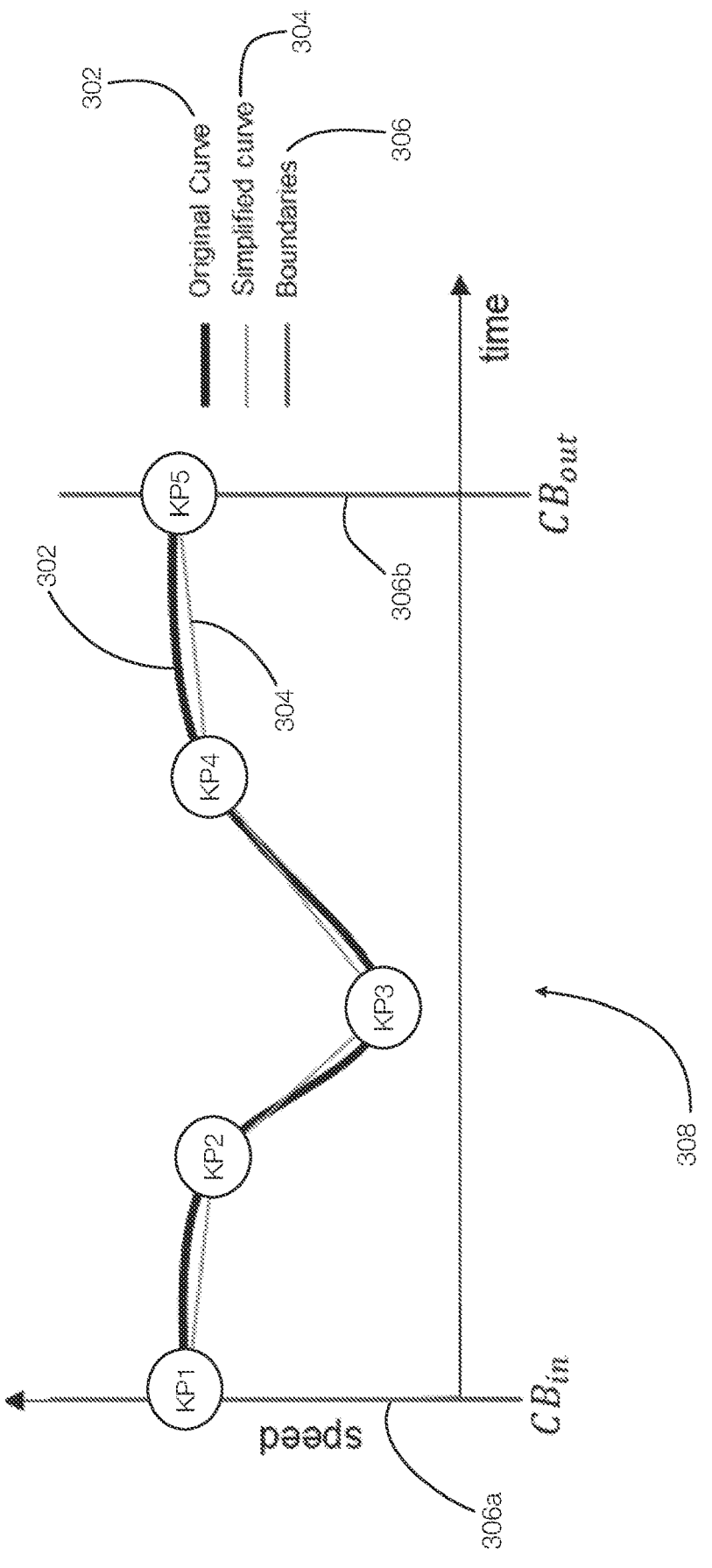
FIG. 3 discloses aspects of example speed progressions.

FIG. 3 discloses aspects of speed progressions, which are representative of many possible speed progressions. The progression or curve 302 ($S_{original}$) represents information obtained from a computer vision operation. In this example, the boundaries 306 are represented in terms of time and an area of interest 308. More specifically, the boundaries 306 are fixed, but boundary crossings are related to time and vehicle speed. Time begins counting when the vehicle enters the area of interest 308. Thus, the vehicle crosses the boundary 306a ($CB_{in}$) and time starts counting. Time stops counting when the vehicle crosses the established boundary 306b ($CB_{out}$). The cornering events represented in FIG. 3 may have different time durations t that depend on the speed of the vehicle entering the area of interest 308 and decisions made during the cornering maneuver (e.g., when braking is applied, when retaking (increased throttle) is performed). As a result, a length of the curve may vary and the time required to traverse the area of interest 308 may vary from one cornering event to the next cornering event.

In one example, the amount of information stored for the curve 302 may be large. As a result, the curve is reduced to five points as previously described in one embodiment: $KP_1$, $KP_2$, $KP_3$, $KP_4$, $KP_5$. Each of these points may be a tuple with (ID, timestamp, speed). This procedure also aids a DTW operation by allowing the comparison to be performed on a smaller number of points. This makes the solution easier to understand and decreases computing costs. Of course, embodiments of the invention are not limited to five points and may use more or less points.

The segments of the simplified curve 304 are now described. Insights may be interpreted or inferred from these segments (e.g., 4 segments in the example of FIG. 3). The segment $KP_{1-2}$ is the time to start braking. The segment $KP_{2-3}$ is a braking duration. The segments $KP_{2-4}$ is the time to perform the cornering maneuver.

During usage, the key points $KP_1$, $KP_3$ and $KP_5$ are directly provided or acquired. The extreme or end key points, $KP_1$ and $KP_5$ are straightforward and related to the entering and exiting speed, and $KP_3$ is an index related to the lowest speed or the cornering apex. The other two points $KP_2$, $KP_4$ may be extracted from the original curve 302. In one example, the inflection points are identified using differentiation as illustrated in FIG. 1. In one example, an index is provided to demonstrate if the vehicle is coming from the left or from the right for a better comparison with a relevant target profile or ideal profile.

FIG. 4 discloses aspects of extracting key points from a curve. The pseudocode 402 illustrates an example of extracting key points 1-5 from a curve. When extracting the key points, the key points may be stored in a vector whose size is 5 in this example. Embodiments of the invention may use different numbers of key points. Each entry in the vector is a tuple with (ID, timestamp, speed). FIG. 4 is described with respect to a measured or acquired curve S.

More specifically, the curve S may be indexed and the points of the curve are associated with an index. In this example, the tuple of the first key point $KP_1$ is populated with an ID of 1, a timestamp corresponding to the curve with an index value of 1 (S[1]), and a speed measured at that point of the curve. The tuple of the fifth key point $KP_5$ is populated with an ID of 5 and a timestamp of corresponding to an index of (end) S[end], and the speed measured at that end point of the curve S. The tuple of the third key point $KP_3$ is populated with an ID of 3 and a timestamp of an index that corresponds to a minimum of the curve S or min(S).

The tuple of the second key point $KP_2$ is populated with an ID of 2, and a timestamp corresponding to an index of a minimum of the differential curve S_diff. The tuple of the fourth key point $KP_4$ is populated with an ID of 4, and a timestamp corresponding to an index of a maximum of the differential curve S_diff.

Figure 5:
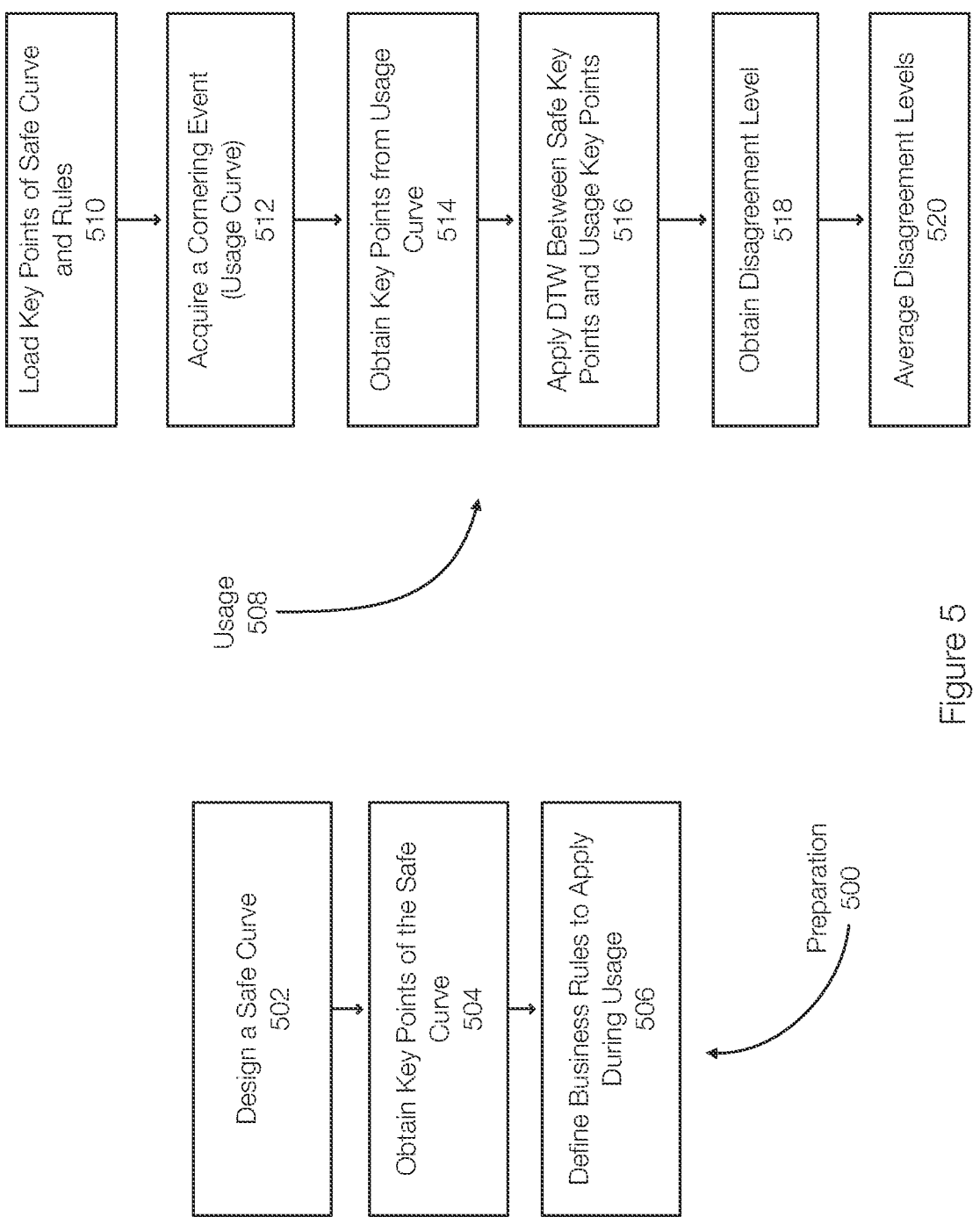
FIG. 5 discloses aspects of preparing and using a cornering pipeline to determine an amount of disagreement.

FIG. 5 discloses aspects of preparing and using a cornering pipeline or method to determine an amount or level of disagreement. The aspect of the speed versus time curve can change among vehicles or driving styles. In the method 500, a safe curve or safe mode curve (an example of a target curve) is generated or designed 502. By way of example, a safe curve, $S_{safe}$, represents a standard to be followed and is used for further comparison, safety, and compliance assessment. Standard cornering curves may be built by subject matter experts using domain knowledge or asking a suitable driver to perform a cornering maneuver while the computer vision method and the solution module is operating.

In the method 500, key points of the safe curve are obtained 504. These may be obtained using, for example, the pseudocode of FIG. 4. The safe mode curve $S_{safe}$ is processed to extract key points of interest, namely $KP_{safe}$. In this example, there are 5 safe key points $KP_{safe\ 1-5}$, but embodiments of the invention may be adapted to include fewer or more points.

The preparation method 500 may also include defining 506 rules to apply during the usage method 508. In one example, differences between a safe curve and a usage curve obtained during usage may yield a risk level, which provides or can represent a safety assessment. Risk level may be performed in segments, considering predefined rules $R_i$, which may be derived from safety driving assumptions.

In one example, the rules may be composed of at least two KP points. For example, three hypothetical rules (R) that indicate a deviation from $S_{safe}$ are:

$R_1$: a high acceleration can reduce response time and create dangerous scenarios. A high acceleration is indicated by a short relation in time between $KP_3$ and $KP_5$ (or the corresponding segments $KP_{3-4}$ and $KP_{4-5}$.

$R_2$: a high deacceleration may cause cargo drop for forklifts (or other vehicles) or cause rear-end crashes. This is related to the segments $KP_{1-2}$ and $KP_{2-3}$.

$R_3$: a lower curve length indicates a high overall cornering speed, which is relates to the segments between points $KP_1$ and $KP_5$.

These are example rules that may be applied to a cornering event. The usage method (evaluating a cornering event) 508 includes loading 510 the key points of a safe curve and the corresponding rules. Next, a cornering event (or usage curve) is acquired 512. More specifically, as a vehicle crosses into or enters an area of interest and subsequently leaves the area of interest, a usage curve $S_{usage}$ is acquired using computer vision in one example. The usage curve may be processed to identify or obtain 514 the key points of the usage curve ($KP_{usage}$). As the safe mode curve profile is time dependent and drivers will inevitably perform a cornering maneuver with different durations, the $S_{usage}$ will exhibit time dilatation/compression if the curve is executed faster or slower than the safe curve.

In one example, map points of $S_{usage}$ are mapped to the map points of $S_{safe}$. To circumvent this mapping problem of mapping all points, a DTW operation can be applied to compensate for the time dilatation and correlate the key points between curves. In effect, the $KP_{usage}$ points are mapped to the $KP_{safe}$ points.

Figure 6:
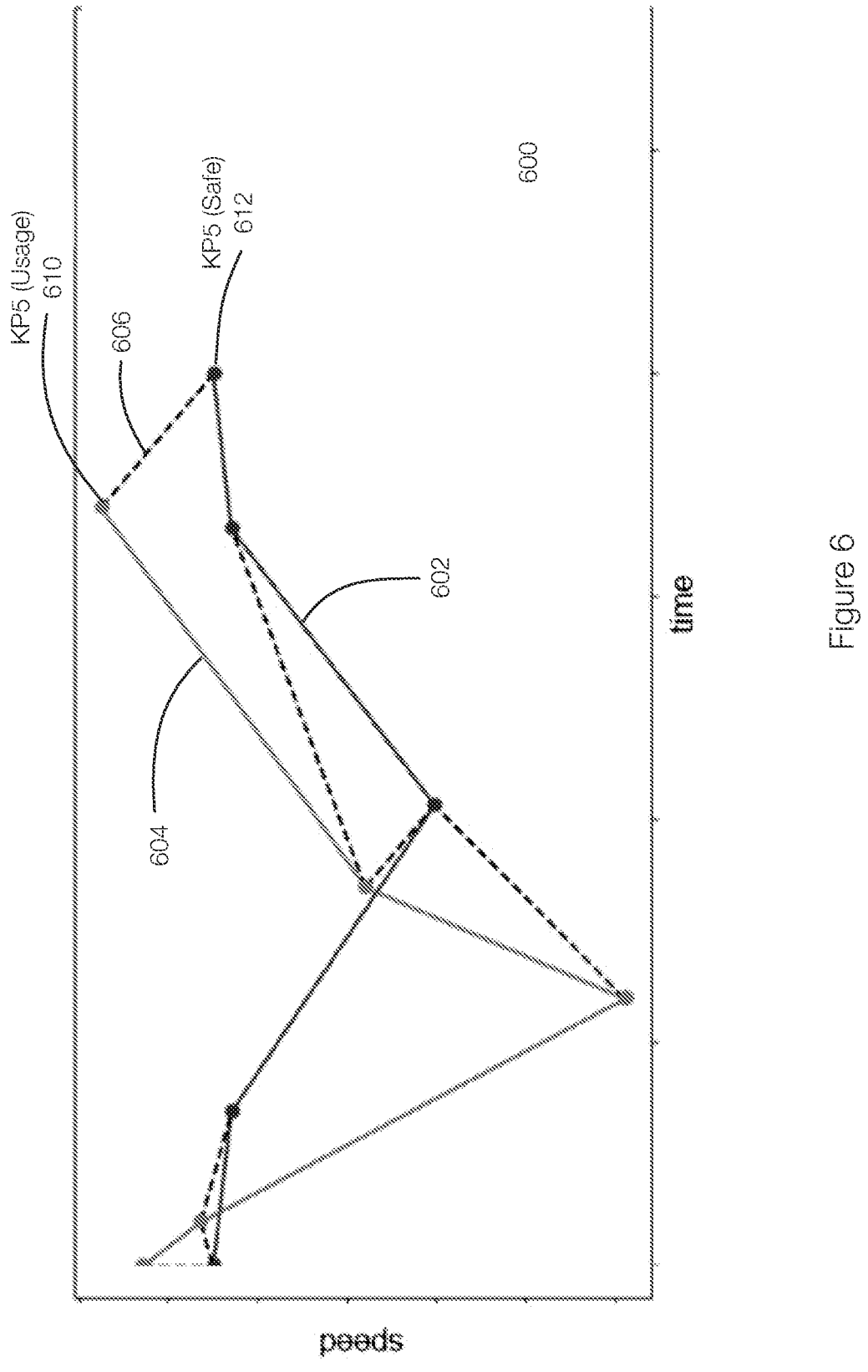
FIG. 6 discloses aspects of a dynamic time warping operation to compensate for time dilation/compression when mapping a usage curve to a safe curve.

FIG. 6 discloses aspects of a DTW operation to compensate for time dilation/compression when mapping a usage curve to a safe curve. As previously stated, the output of a DTW operation may range from zero to positive infinity. As a result, a transfer function is used to cap the upper boundary such that the result can be interpreted in terms of percentage.

In one example, a standard is provided. The standard, in one example, is obtained by setting operational thresholds $Speed_{var}$ in terms of entry speed. By way of explanation, a maximum variation of speed $Speed_{var}$ may be set to 50% more or less than the $KP_{safe1}$, key point 1 from $KP_{safe}$. This amount of variation represents a maximum deviation that a vehicle can achieve from the safest entering may be determined by a user considering the operational scenario or set as a predetermined value.

FIG. 6 more specifically illustrates key points $KP_{safe1}$-$KP_{safe5}$ of a safe curve 602 and key points $KP_{usage1}$-$KP_{usage5}$ of a usage curve 604. The point mappings (dashed lines) are illustrated in FIG. 6. By way of example, a mapping 606 between the points $KP_{safe5}$ 612 to $KP_{usage5}$ 610 is illustrated. As illustrated, it is possible for one or more of the $KP_{usage}$ points to be mapped to more than one of the $KP_{safe}$ points. In one example, the first and last index are mapped one-to-one. Thus, by way of example only, $KP_{usage1}$ is mapped to $KP_{safe1}$ and $KP_{usage5}$ is mapped to $KP_{safe5}$. The mapping may depend on the method used to map points. In one example, a final one-to-one mapping may be determined based on an order of the key points in the curves.

Returning to FIG. 5, DTW is applied between the respective key points of the safe curve 602 and the usage curve 604. Obtaining or determining the maximum DTW distances may be performed as follows.

Initially, $KP_{safe}$ (the five key point of the safe curve in this example) are loaded. Next, the first key point of points $KP_{safe1}$ is obtained and $Speed_{var}$ is added or subtracted (or any other value inserted by the user) to all of the key points. This translates the safe curve upwards or downwards such that, in one example, embodiments of the invention are reliable with respect to real-world conditions. Next, DTW is applied to both set of points and the value is stored as $DTW_{maximum}$.

The $DTW_{maximum}$ value defines an upper limit of the transfer function. In one example, the $DTW_{maximum}$ is adjusted to be a straight line because $DTW_{maximum}$ stands for 100%. As a consequent, the transfer function, which provides the disagreement level considering the ongoing DTW distance input, is represented as follows:

$$\text{disagreement } (DTW_{usage}) = \frac{100\% * DTW_{usage}}{DTW_{maximum}}. \qquad \text{equation (1)}$$

Thus, the disagreement level is obtained 518. In one example, the disagreement levels for each of the key points may be averaged to determine an overall disagreement level. The average, however, is an example. More generally, the overall disagreement level may be based on a similarity measure between the safe key points and the corresponding usage key points.

Next, business rules may be applied, which may include comparing segments of $S_{safe}$ and $S_{usage}$ in terms of $KP_{safe}$ and $KP_{usage}$.

FIG. 7 discloses aspects of determining a disagreement level. The pseudocode 702 determines an average distance for all of the key points, which is a measurement of risk. The rules may have different impacts or results. For example, a rule (when satisfied) may trigger a warning to a driver, result in automatic braking at the vehicle, store the cornering event for review with a driver, or the like. However, the rules do not have any impact on the disagreement level or on determining the disagreement level as illustrated in equation (1). Further, in one example, $Speed_{var}$ is typically similar to a real-world operational speed. Otherwise, the disagreement level may not be reliable because the parameters translates the reference upwards or downwards.

It is noted that embodiments disclosed herein, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, event capturing operations, profile comparison operations, safety assessment operations, drive/vehicle profile operations, or the like. More generally, the scope of this disclosure embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable perform operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments may be employed include, but are not limited to, Microsoft Azure, Amazon AWS, Dell EMC Cloud Storage Services, and Google Cloud. More generally however, the scope of this disclosure is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, servers and clients, for example, may likewise take the form of software, physical machines, containers, or virtual machines (VMs), though no particular component implementation is required for any embodiment.

As used herein, the term 'data' is intended to be broad in scope. Example embodiments are applicable to any system capable of storing and handling various types of objects, in analog, digital, or other form.

It is noted that any operations of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments. These are presented only by way of example and are not intended to limit the scope of this disclosure or the claims in any way.

Embodiment 1. A method comprising: loading safe key points of a safe curve into a memory of a cornering profile system, acquiring a usage curve corresponding to a cornering maneuver performed by a vehicle, determining usage key points of the usage curve and storing the usage key points in the memory, determining distances between the safe key points and corresponding usage key points, determining a disagreement level between the safe curve and the usage curve based on the distances, and performing a safety related operation based on the disagreement level.

Embodiment 2. The method of embodiment 1, further comprising defining the safe curve.

Embodiment 3. The method of embodiment 1 and/or 2, wherein the safe curve is defined by a subject matter expert or captured and generated by the cornering profile system.

Embodiment 4. The method of embodiment 1, 2, and/or 3, further comprising acquiring the usage curve using computer vision.

Embodiment 5. The method of embodiment 1, 2, 3, and/or 4, wherein the usage curve is associated with an area of interest defined by a first boundary and a second boundary.

Embodiment 6. The method of embodiment 1, 2, 3, 4, and/or 5, further comprising determining a first usage key point when the vehicle enters the area of interest, a second usage key point corresponding to a first inflection point in the usage curve, a third usage key point corresponding to a cornering apex of the usage curve, a fourth usage key point corresponding to a second inflection point, and a fifth usage key point corresponding to an exit of the vehicle from the area of interest.

Embodiment 7. The method of embodiment 1, 2, 3, 4, 5, and/or 6, wherein the first usage key point is associated with an entry speed of the vehicle, the second usage key point is related to a start of braking, the third key point is related to a lowest speed, the fourth key usage point is related to a start of retaking, and the fifth key usage point is related to an exit speed of the vehicle from the area of interest.

Embodiment 8. The method of embodiment 1, 2, 3, 4, 5, 6, and/or 7, wherein the disagreement level is based on a similarity measure between the safe key points and the corresponding usage key points, wherein a higher disagreement level indicates a higher risk.

Embodiment 9. The method of embodiment 1, 2, 3, 4, 5, 6, 7, and/or 8, further comprising determining an upper boundary of a transfer function such that the disagreement level is expressed in terms of percentage.

Embodiment 10. The method of embodiment 1, 2, 3, 4, 5, 6, 7, 8, and/or 9, wherein the safe key points and the usage key points comprise a vector of tuples, each of the tuples, including an identifier, a timestamp, and a speed.

Embodiment 11. The method of embodiment 1, 2, 3, 4, 5, 6, 7, 8, 9, and/or 10, further comprising applying rules to assess a safety of the cornering event, wherein the rules can be applied to one or more segments of the usage curve.

Embodiment 12. The method of embodiment 1, 2, 3, 4, 5, 6, 7, 8, 9, 10, and/or 11, further comprising performing simulations in a digital twin to compare potential cornering events.

Embodiment 13. The method of embodiment 1, 2, 3, 4, 5, 6, 7, 8, 9, 10, 11, 12, and/or 12, wherein the safety-related operation includes at least one of initiating training for autonomous vehicles, clustering cornering events for each vehicle and/or each vehicle driver, generating an alert related to a risk level.

Embodiment 14. A system, comprising hardware and/or software, operable to perform any of the operations, methods, or processes, or any portion of any of these, disclosed herein.

Embodiment 15. A non-transitory storage medium having stored therein instructions that are executable by one or more hardware processors to perform operations comprising the operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 8:
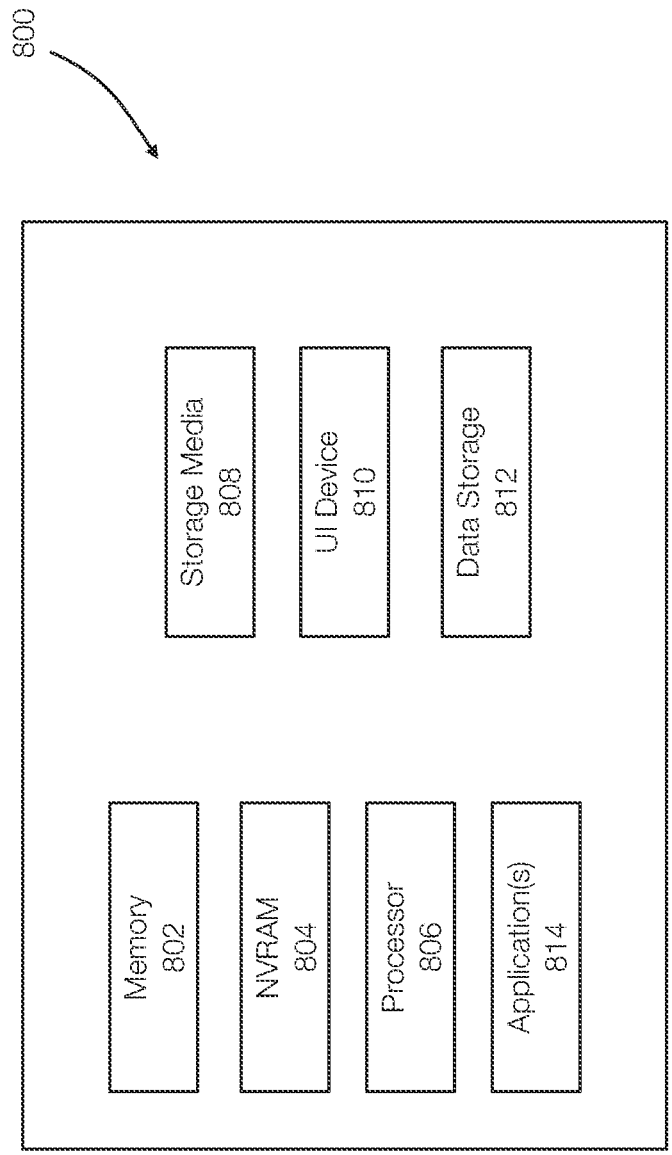
FIG. 8 discloses aspects of a computing device, system, or entity.

With reference briefly now to FIG. 8, any one or more of the entities disclosed, or implied the Figures and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method comprising:

loading safe key points of a safe curve into a memory of a cornering profile system;

acquiring a usage curve corresponding to a cornering maneuver performed by a vehicle, wherein the usage curve is associated with an area of interest defined by a first boundary and a second boundary;

determining usage key points of the usage curve and storing the usage key points in the memory, the usage key points including a first usage key point when the vehicle enters the area of interest, a second usage key point corresponding to a first inflection point in the usage curve, a third usage key point corresponding to a cornering apex of the usage curve, a fourth usage key point corresponding to a second inflection point, and a fifth usage key point corresponding to an exit of the vehicle from the area of interest, wherein the first usage key point is associated with an entry speed of the vehicle, the second usage key point is related to a start of braking, the third usage key point is related to a lowest speed, the fourth key usage point is related to a start of retaking, and the fifth key usage point is related to an exit speed of the vehicle from the area of interest;

determining distances between the safe key points and corresponding usage key points;

determining a disagreement level between the safe curve and the usage curve based on the distances; and performing a safety related operation based on the disagreement level.

2. The method of claim 1, further comprising defining the safe curve.

3. The method of claim 2, wherein the safe curve is defined by a subject matter expert or captured and generated by the cornering profile system.

4. The method of claim 1, further comprising acquiring the usage curve using computer vision.

5. The method of claim 1, wherein the disagreement level is based on a similarity measure between the safe key points and the corresponding usage key points, wherein a higher disagreement level indicates a higher risk.

6. The method of claim 5, further comprising determining an upper boundary of a transfer function such that the disagreement level is expressed in terms of percentage.

7. The method of claim 6, wherein the safe key points and the usage key points comprise a vector of tuples, each of the tuples, including an identifier, a timestamp, and a speed.

8. The method of claim 7, further comprising applying rules to assess a safety of the cornering event, wherein the rules can be applied to one or more segments of the usage curve.

9. The method of claim 1, further comprising performing simulations in a digital twin to compare potential cornering events.

10. The method of claim 1, wherein the safety-related operation includes at least one of initiating training for autonomous vehicles, clustering cornering events for each vehicle and/or each vehicle driver, generating an alert related to a risk level.

11. A non-transitory storage medium having stored therein instructions that are executable by one or more hardware processors to perform operations comprising:

loading safe key points of a safe curve into a memory of a cornering profile system;

acquiring a usage curve corresponding to a cornering maneuver performed by a vehicle, wherein the usage curve is associated with an area of interest defined by a first boundary and a second boundary;

determining usage key points of the usage curve and storing the usage key points in the memory, wherein the usage key points include a first usage key point when the vehicle enters the area of interest, a second usage key point corresponding to a first inflection point in the usage curve, a third usage key point corresponding to a cornering apex of the usage curve, a fourth usage key point corresponding to a second inflection point, and a fifth usage key point corresponding to an exit of the vehicle from the area of interest, wherein the first usage key point is associated with an entry speed of the vehicle, the second usage key point is related to a start of braking, the third usage key point is related to a lowest speed, the fourth key usage point is related to a start of retaking, and the fifth key usage point is related to an exit speed of the vehicle from the area of interest;

determining distances between the safe key points and corresponding usage key points;

determining a disagreement level between the safe curve and the usage curve based on the distances, wherein the disagreement level is based on a similarity measure between the safe key points and the corresponding usage key points, wherein a higher disagreement level indicates a higher risk;

determining an upper boundary of a transfer function such that the disagreement level is expressed in terms of percentage; and performing a safety related operation based on the disagreement level.

12. The non-transitory storage medium of claim 11, further comprising defining the safe curve, wherein the safe curve is defined by a subject matter expert or captured and generated by the cornering profile system.

13. The non-transitory storage medium of claim 11, further comprising acquiring the usage curve using computer vision.

14. The non-transitory storage medium of claim 11, further comprising determining an upper boundary of a transfer function such that the disagreement level is expressed in terms of percentage.

15. The non-transitory storage medium of claim 11, wherein the safe key points and the usage key points comprise a vector of tuples, each of the tuples, including an identifier, a timestamp, and a speed.

16. The non-transitory storage medium of claim 15, further comprising at least one of:

applying rules to assess a safety of the cornering event, wherein the rules can be applied to one or more segments of the usage curve;

performing simulations in a digital twin to compare potential cornering events; and wherein the safety-related operation includes at least one of initiating training for autonomous vehicles, clustering cornering events for each vehicle and/or each vehicle driver, generating an alert related to a risk level.

\* \* \* \* \*